(12) United States Patent
Carrasco et al.

(10) Patent No.: US 7,225,184 B2
(45) Date of Patent: May 29, 2007

(54) DISAMBIGUATION OF SEARCH PHRASES USING INTERPRETATION CLUSTERS

(75) Inventors: John Joseph M. Carrasco, Pasadena, CA (US); Daniel C. Fain, Los Angeles, CA (US); Gary William Flake, Altadena, CA (US)

(73) Assignee: Overture Services, Inc., Pasadena, CA (US)

( * ) Notice: Subject to any disclaimer, the term of this patent is extended or adjusted under 35 U.S.C. 154(b) by 586 days.

(21) Appl. No.: 10/623,115

(22) Filed: Jul. 18, 2003

(65) Prior Publication Data

US 2005/0015366 A1 Jan. 20, 2005

(51) Int. Cl.
G06F 17/30 (2006.01)
(52) U.S. Cl. .......................................... 707/3
(58) Field of Classification Search ................ 707/1, 707/2, 3, 10, 200; 709/224
See application file for complete search history.

(56) References Cited

U.S. PATENT DOCUMENTS

| | | | |
|---|---|---|---|
| 6,006,221 | A | 12/1999 | Liddy et al. |
| 6,049,777 | A | 4/2000 | Sheena et al. |
| 6,269,361 | B1 | 7/2001 | Davis et al. |
| 2003/0055816 | A1* | 3/2003 | Paine et al. ................ 707/3 |
| 2004/0019588 | A1* | 1/2004 | Doganata et al. ........... 707/3 |
| 2005/0289120 | A9* | 12/2005 | Soulanille et al. ........... 707/3 |

OTHER PUBLICATIONS

A. Dempster, N. Laird, and D. Rubin; Maximum Liklihood From Incomplete Data via the EM Algorithm; Journal of the Royal Statistical Society, Series B, vol. 39, pp. 1-38, (1977).

D. Beeferman and A. Berger; Aggolmerative clustering of a search engine query log; Proceedings of the 6th International Conference on Knowledge Discovery and Data Mining (ACM SIGKDD), Boston, MA (2000).

G. Flake, S. Lawrence. and C. Giles; Efficient Identification of Web Communities; Proceedings of the 6th International Conference on Knowledge Discovery and Data Mining (ACM SIGKDD), Boston, MA (2000).

M. Hearst and J. Pedersen; Reexamining the Cluster Hypothesis: Scatter/Gather on Retrieval Results; Proceedings of 19th Annual International ACM SIGIR '96, Zurich (Aug. 1996).

H. Varian; Economics and Search; Proceedings of ACM-SIGIR '99; Berkly, CA (1999).

* cited by examiner

Primary Examiner—Etienne P LeRoux
(74) Attorney, Agent, or Firm—Dreier LLP

(57) ABSTRACT

In one implementation a method for disambiguation of search phrases is provided, which may include identifying interpretation clusters using bidded search terms of content providers and influencing a position of a search result in a search results list based on the interpretation clusters. In one implementation a method is provided for interpretation clustering, which may include identifying terms and associated content providers and calculating a matrix from the identified terms and associated content providers. Similarity scores between content providers based on the matrix are calculated and interpretation clusters are assigned using the similarity scores. Bidded search terms and/or searcher click-through terms may be used. In one implementation, a method is provided for increasing the relevance of search results, which may include receiving a search query and identifying the search query as ambiguous.

90 Claims, 9 Drawing Sheets

| TERMS | FIRST COFFEE MERCHANT | COMPUTER PROGRAMMER | SECOND COFFEE MERCHANT |
|---|---|---|---|
| JAVA | x | x | x |
| COFEE | x | | |
| COFFEE | x | | x |
| COFFEE GIFT | x | | x |
| VINEYARD | x | | |
| PROGRAMMING JAVA | | x | |
| PROGRAMMING | | x | |
| BEVERAGE | | | x |
| TEA | | | x |
| ANSI C | | x | |
| BUILD WEB SITE | | x | |

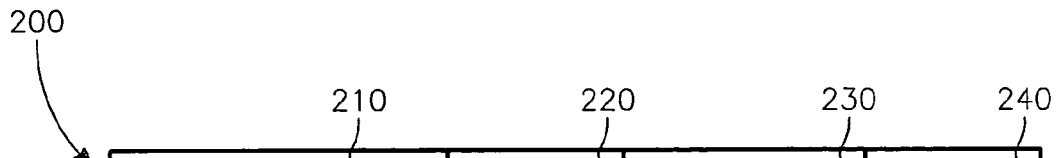

FIG. 2

$$A = \begin{pmatrix} 1 & 1 & 1 & 1 & 1 & 0 & 0 & 0 & 0 & 0 & 0 \\ 1 & 0 & 0 & 0 & 0 & 1 & 1 & 0 & 0 & 1 & 1 \\ 1 & 0 & 1 & 1 & 0 & 0 & 0 & 1 & 1 & 0 & 0 \end{pmatrix}$$

FIG. 3

$$C' = \begin{matrix} & \begin{matrix} \text{FIRST} \\ \text{COFFEE} \\ \text{MERCHANT} \end{matrix} & \begin{matrix} \text{COMPUTER} \\ \text{PROGRAMMER} \end{matrix} & \begin{matrix} \text{SECOND} \\ \text{COFFEE} \\ \text{MERCHANT} \end{matrix} \\ \begin{matrix} \text{FIRST COFFEE MERCHANT} \\ \text{COMPUTER PROGRAMMER} \\ \text{SECOND COFFEE MERCHANT} \end{matrix} & \begin{pmatrix} 1 & -0.4667 & 0.2667 \\ -0.4667 & 1 & -0.4667 \\ 0.2667 & -0.4667 & 1 \end{pmatrix} \end{matrix}$$

FIG. 4

$$M = \begin{matrix} \text{FIRST COFFEE MERCHANT} \\ \text{COMPUTER PROGRAMMER} \\ \text{SECOND COFFEE MERCHANT} \end{matrix} \begin{pmatrix} \text{FIRST COFFEE MERCHANT} & \text{COMPUTER PROGRAMMER} & \text{SECOND COFFEE MERCHANT} \\ 5 & 1 & 3 \\ 1 & 5 & 1 \\ 3 & 1 & 5 \end{pmatrix}$$

FIG. 5

$$C = \begin{matrix} \text{FIRST COFFEE MERCHANT} \\ \text{COMPUTER PROGRAMMER} \\ \text{SECOND COFFEE MERCHANT} \end{matrix} \begin{pmatrix} \text{FIRST COFFEE MERCHANT} & \text{COMPUTER PROGRAMMER} & \text{SECOND COFFEE MERCHANT} \\ 1 & -0.866025 & 0.5 \\ 0.866025 & 1 & -0.866025 \\ 0.866025 & 0.866025 & 1 \end{pmatrix}$$

FIG. 6

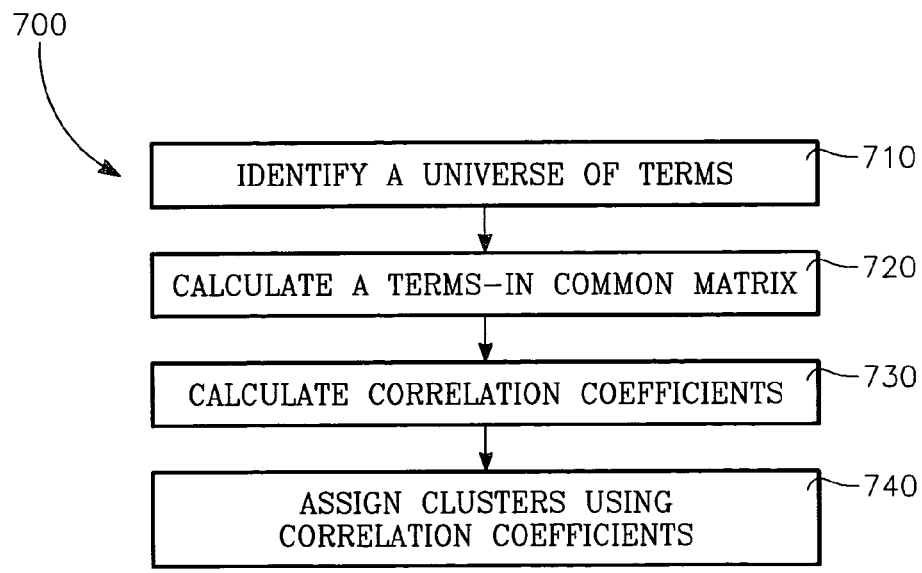

FIG. 7

|  | COFFEE MERCHANT A | COFFEE MERCHANT B | TOURISM MERCHANT C | TOURISM MERCHANT D |
|---|---|---|---|---|
| SEARCHER 1 | 1 | 1 | 0 | 0 |
| SEARCHER 2 | 0 | 0 | 1 | 1 |
| SEARCHER 3 | 1 | 0 | 0 | 0 |
| SEARCHER 4 | 1 | 1 | 1 | 1 |

$A' = $ (matrix above)

$$S_1 = \begin{matrix} \text{FIRST COFFEE MERCHANT} \\ \text{COMPUTER PROGRAMMER} \\ \text{SECOND COFFEE MERCHANT} \end{matrix} \begin{pmatrix} \text{FIRST COFFEE MERCHANT} & \text{COMPUTER PROGRAMMER} & \text{SECOND COFFEE MERCHANT} \\ 1 & 0 & 1 \\ 0 & 0 & 0 \\ 1 & 0 & 1 \end{pmatrix}$$

FIG. 15A $$S_2 = \begin{matrix} \text{FIRST COFFEE MERCHANT} \\ \text{COMPUTER PROGRAMMER} \\ \text{SECOND COFFEE MERCHANT} \end{matrix} \begin{pmatrix} \text{FIRST COFFEE MERCHANT} & \text{COMPUTER PROGRAMMER} & \text{SECOND COFFEE MERCHANT} \\ 1 & 0 & 1 \\ 0 & 0 & 0 \\ 1 & 0 & 2 \end{pmatrix}$$

FIG. 15B $$S_n = \begin{matrix} \text{FIRST COFFEE MERCHANT} \\ \text{COMPUTER PROGRAMMER} \\ \text{SECOND COFFEE MERCHANT} \end{matrix} \begin{pmatrix} \text{FIRST COFFEE MERCHANT} & \text{COMPUTER PROGRAMMER} & \text{SECOND COFFEE MERCHANT} \\ 20 & 3 & 10 \\ 3 & 16 & 2 \\ 10 & 2 & 22 \end{pmatrix}$$

FIG. 15C $$C_{java} = \begin{matrix} \text{FIRST COFFEE MERCHANT} \\ \text{COMPUTER PROGRAMMER} \\ \text{SECOND COFFEE MERCHANT} \end{matrix} \begin{pmatrix} \text{FIRST COFFEE MERCHANT} & \text{COMPUTER PROGRAMMER} & \text{SECOND COFFEE MERCHANT} \\ 1 & -0.958187 & 0.788139 \\ -0.958187 & 1 & -0.931305 \\ 0.788139 & -0.931305 & 1 \end{pmatrix}$$

FIG. 16

DISAMBIGUATION OF SEARCH PHRASES USING INTERPRETATION CLUSTERS

BACKGROUND

In information searching, many search queries are ambiguous. Ambiguity in the context of search exists when a number of possible interpretations may exist for a given query. The search phrase "java" for example, may be related to coffee or to computer programming. In the context of Internet searching, the search term "java" may be used in connection with offering tips on learning the programming language, selling coffee, travel to Indonesia, or with Contractors who offer to do development in java for any willing clients.

Another type of ambiguity occurs when a phrase which is relatively unambiguous appears with too little context to know what the user is seeking. For example, a user who searches on Benjamin Franklin could be looking for his biography, picture, discoveries, sayings, etc.

Yet another type of ambiguity arises when a search query is matched to one or more shorter phrases. For example, if a search engine can produce result sets for "vintage hat" or for "hat pin" and a user searches on "vintage hat pin," what results or combination of results from the shorter phrases should be shown?

Interpretation clusters may be used to direct the presentation of the search results to the user. An interpretation cluster is a subset of search results, for an ambiguous search phrase, that share the same meaning. Search listings in a result set may be ordered so that the user may select a result that satisfies his intended meaning. This can maximize the relevance of the search results.

Improving the relevance of search results reduces the search time for the user. Further, once the intent of the user is captured, it can be used to provide the user with additional relevant results.

Clustering techniques as applied to web content providers have focused on text analysis and link analysis. Text analysis techniques utilize word frequency or usage within documents or web pages/sites to form clusters, but require that documents are sufficiently verbose so as to be recognizably distinct. Link analysis utilizes existing hyperlinks between web pages/sites for clustering. A useful technique for "Efficient Identification of Web Communities" is presented by Flake, et al., in *Proceedings of the Sixth International Conference on Knowledge Discovery and Data Mining* (ACM SIGKDD-2000), pp. 150–160, August 2000, herein incorporated by reference in its entirety. One limitation of link analysis in general is that it requires the existence of meaningful links between web pages.

SUMMARY

In one implementation, a method for disambiguation of search phrases is provided. Such a method may include identifying interpretation clusters using bidded search terms of content providers and influencing a position of a search result in a search results list based on the interpretation clusters. The search results list may be provided in response to a search query received by a searcher for review by the searcher.

In one implementation, a method is provided for interpretation clustering. The method includes identifying a plurality of terms and associated content providers and calculating a matrix from the identified plurality of terms and associated content providers. Similarity scores between content providers based on the matrix are calculated and interpretation clusters are assigned using the similarity scores. In some implementations, bidded search terms and/or searcher clickthrough terms are used.

In some implementations, a method is provided which includes utilizing clustering for: (a) identifying a cluster including a representative content provider; (b) evaluating search terms for canonicalization; (c) evaluating a selection of a search term by a content provider; (d) assigning an ambiguity score to selection of a search term by a content provider; (e) ordering of search results; or (f) selecting a bidded search result for a search query without an exact match.

In one implementation, a method is provided for increasing the relevance of search results. Such a method may include receiving a search query and identifying the search query as ambiguous. It may further include clustering a plurality of search results for the search query into interpretation clusters and generating a search results list based on the interpretation clusters. In some implementations, the clustering of search results includes using bidded data, and/or using clickthrough data. In some implementations, search results from different interpretation clusters may be interleaved when generating the search results list.

BRIEF DESCRIPTION OF THE DRAWINGS

FIG. 2 is a table illustrating examples of bidded terms associated with web content providers.

FIG. 3 is an occurrence matrix A derived from the example of bidded terms and associated web content providers of FIG. 2.

FIG. 4 is a matrix C' of Pearson's correlation coefficients derived from the occurrence matrix A of FIG. 3.

FIG. 5 is a co-occurrence matrix M of terms in common based on the example of bidded terms and associated web content providers of FIG. 2.

FIG. 6 is a matrix C of Pearson's correlation coefficients derived from the co-occurrence matrix M of FIG. 5.

FIG. 7 is a flow chart illustrating clustering in accordance with one possible implementation of the present invention.

FIG. 15A–15C shows an example progression of searcher clickthrough data in co-occurrence matrices $S_1$, $S_2$, and $S_n$ of clickthrough terms in common.

FIG. 16 shows a matrix $C_{java}$ of Pearson's correlation coefficients corresponding to the clickthrough matrix $S_n$ of FIG. 15C.

DESCRIPTION

With the clustering techniques described herein, the data considered is binary occurrence data, which represents the occurrence of an action between two types of entities, for example actors and objects. Discussed further below, the actors and objects may be identified in the search terms selected by the content provider, or in searcher click-through data. In one area associated with network searching, information providers can influence a position of a search listing within a search result set by bidding. Such a system is disclosed in U.S. Pat. No. 6,269,361, by Davis et al., issued Jul. 31, 2001, entitled SYSTEM AND METHOD FOR INFLUENCING A POSITION ON A SEARCH RESULTS LIST GENERATED BY A COMPUTER NETWORK SEARCH ENGINE, which is herein incorporated by reference in its entirety. With selected or bidded search terms, the actors are the accounts of the information providers which bid on the terms, and the objects (of the action of bidding) are the associated the sets of bidded terms or phrases. With searcher click-through data, the actors are the searchers, and the objects are the accounts.

Figure 1:
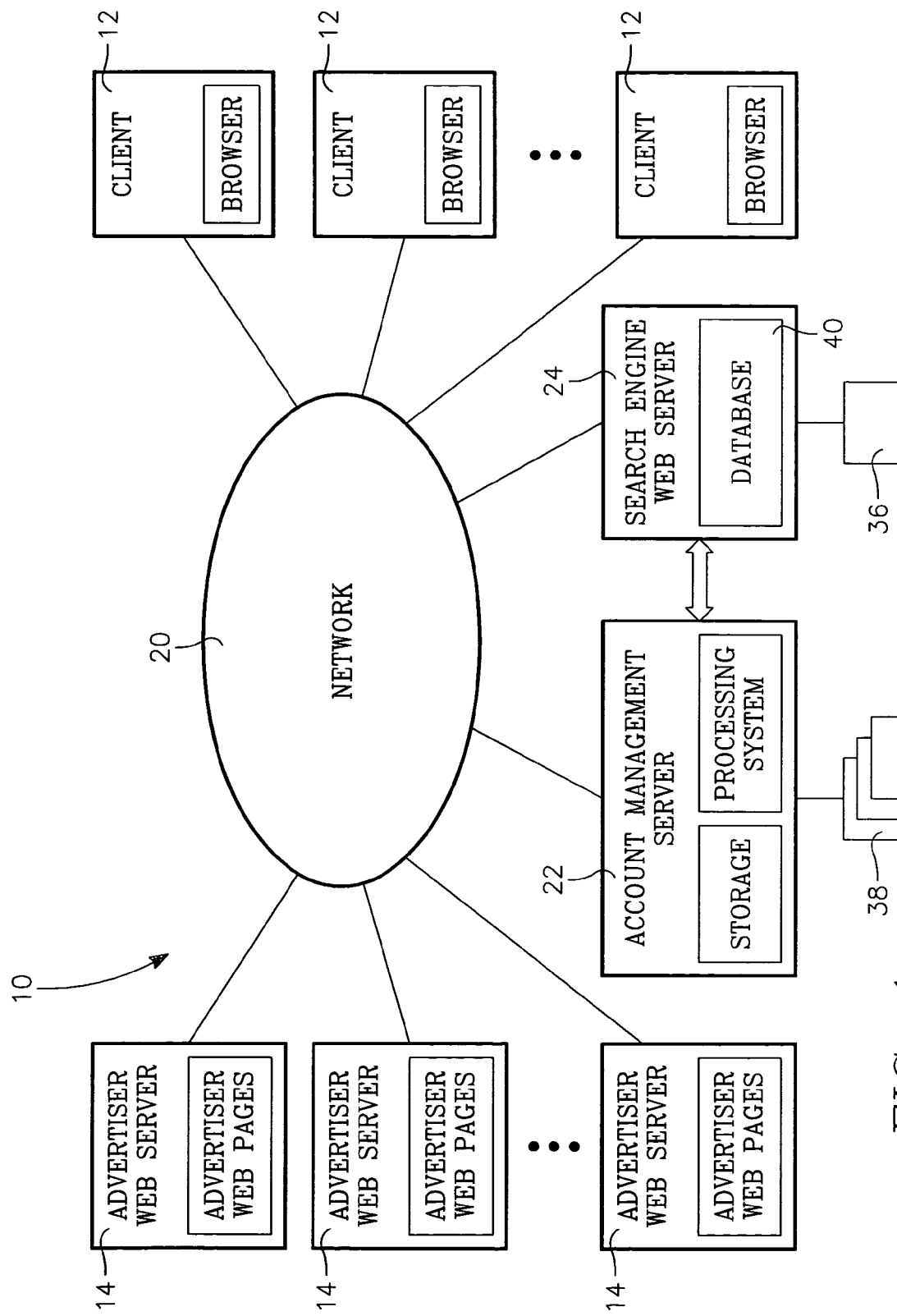
FIG. 1 is a block diagram illustrating a large network system.

Interpretation clusters may be utilized in several areas of searching. As discussed above, in one area associated with network searching, information providers can influence a position of a search listing within a search result set by bidding. As illustrated in FIG. 1, such a system may be embodied in a distributed Internet based system 10 configured in a client/server architecture. A client 12 may perform a search of a search database 40 using a search engine web page 36. The search engine 24 and search database 40 may reside on a search engine web server 24. The search engine web page 36 may include a query box in which a searcher may type in a search term comprising one or more keywords. Alternatively, the searcher may query the search engine web server 24 through a query box hyperlinked to the search engine web server 24 and located on a web page stored at a remote web server, or through an automated means generated by a software agent, which may be an automated process representing a user's interest. The search engine web server 24 will generate a search result list page after processing and mapping the query to the search database 40. The search results may include listings from providers that have "bidded" on the search terms. By bidding, the provider can influence the position of a search listing within the search results list. The results list may contain one or more search listings from providers. A search listing may include such information as URL, site information, search term, bid amount, title, description, account information, etc. The search engine web server 24 will then transmit the search results list to the searcher at the client computer 12 via the network 20.

Interpretation clusters may be used in influencing the order of the search results in a listing. The clusters may suggest a preferred meaning, which may be given priority in a results list. Or, results from different clusters may be interleaved so that the user is presented with listings from different clusters sooner rather than later. Thus, the searcher may select a result that satisfies his intended meaning sooner rather than later. This can maximize the relevance of the search results.

I. Correlation in Shared Search Terms

In systems such as described in U.S. Pat. No. 6,269,361, there is a data-store of human provided conceptual association which is available in such a search environment. Search results are served for phrases that are chosen by the information providers. Often the terms are human selected and edited. The vast majority of the providers bid on more than one search phrase, which means that each provider defines a subspace of phrases that are all conceptually associated with its site. When a set of providers share a subspace of search terms that are conceptually associated, their line ads, when they appear for any of those phrases, are also conceptually associated, strongly suggesting a similar, if not the same interpretation.

A. Bidded Phrases in Common

Some methods for deriving the associations involves looking at the number of bidded phrases in common for providers who appear for a given search phrase. FIG. 2 shows a table 200 illustrating example lists of the bidded terms 210 for three providers: a first Coffee Merchant 220, a Programmer 230, and a second Coffee Merchant 240. An "x" under the provider 220, 230, or 240 indicates that the corresponding term from the list 210 is a bidded term associated with the provider.

FIG. 3 shows a binary occurrence matrix A where the rows correspond to the primary entities, in this case the providers, and the columns correspond to the secondary entities, in this case the bidded phrases. The value of the ith row, jth column of the matrix $A_{ij}$ represents the occurrence of the jth account bidding on the ith phrase. In this example a value of "1" represents positive occurrence. If the jth advertiser bid on the ith term, $A_{ij}=1$, otherwise $A_{ij}=0$. In this example, $A_{26}=1$ which represents that Programmer bid on the search phrase "programming java". $A_{35}=0$ represents that the second Coffee Merchant did not bid on the search phrase "vineyard".

In one implementation, a matrix of correlation coefficients may be constructed from the binary occurrence data of matrix A. In this implementation, Pearson's correlation coefficient is applied to primary vectors in secondary space. Given the binary occurrence matrix A, the similarity between primary entity m and primary entity n is thus Pearson's correlation coefficient between the mth and nth rows of matrix A. If there are N secondary entities, and thus N columns in the matrix A, the similarity between the nth primary entity and the mth primary entity is defined as follows:

$$S(m,n) \equiv \frac{\sum_{\gamma=1}^{N}\left(A_{n\gamma}-\sum_{i=1}^{N}\frac{A_{ni}}{N}\right)\left(A_{m\gamma}-\sum_{j=1}^{N}\frac{A_{mj}}{N}\right)}{\sqrt{\sum_{\alpha=1}^{N}\left(A_{n\alpha}-\sum_{i=1}^{P}\frac{A_{ni}}{N}\right)^{2}}\sqrt{\sum_{\beta=1}^{N}\left(A_{m\beta}-\sum_{j=1}^{N}\frac{A_{mj}}{N}\right)^{2}}} \quad \text{Equation 1.0}$$

This is equivalent to defining the similarity between n and m as the cosine of the angle between the zero meaned nth and mth row vectors of A.

To calculate the similarity score between the first Coffee Merchant and the Computer Programmer, we note that their indices m and n, are 1 and 2 respectively, so S(m,n) is S(1,2). N=11 because there are 11 secondary entities. The secondary entities in this case being the bidded phrases. Thus, Equation 1.0 yields:

$$S(1,2) = \frac{\sum_{\gamma=1}^{11}\left(A_{2\gamma} - \frac{5}{11}\right)\left(A_{1\gamma} - \frac{5}{11}\right)}{\sqrt{\sum_{\alpha=1}^{11}\left(A_{2\alpha} - \frac{5}{11}\right)^2}\sqrt{\sum_{\beta=1}^{11}\left(A_{1\beta} - \frac{5}{11}\right)^2}}$$

$$S(1,2) = \frac{\left(1-\frac{5}{11}\right)^2 + 8\left(1-\frac{5}{11}\right)\left(-\frac{5}{11}\right) + 2\left(-\frac{5}{11}\right)^2}{\sqrt{5\left(1-\frac{5}{11}\right)^2 + 6\left(-\frac{5}{11}\right)^2}\sqrt{5\left(1-\frac{5}{11}\right)^2 + 6\left(-\frac{5}{11}\right)^2}}$$

$$S(1,2) = \frac{-\frac{154}{121}}{\frac{330}{121}}$$

$$S(1,2) = \frac{-77}{165} \approx -0.4667$$

If we carry out this calculation for all accounts represented in the matrix A, we get a matrix C' of correlation coefficients shown in FIG. 4. Note that for illustration purposes, approximate decimal values are shown including only significant figures. These scores, which may also be represented in tabular form, are calculated using the occurrence data. The set of primary entities and associated scores of similarity are utilized in clustering the primary entities, as discussed further below.

Turning to FIG. 5, in an alternate implementation, given the binary occurrence matrix A shown in FIG. 3, a non-binary co-occurrence matrix $M=AA^T$, where $A^T$ is the transpose matrix of matrix A. The matrix $M=AA^T$ and contains co-occurrence data. $M_{i,j}$ is the number of search phrases that the ith linead's account and the jth linead's account have bid on. The matrix M is a square matrix whose dimensions are equal to the number of primary entities that are being clustered, as shown in FIG. 5. The value of $M_{ij}$ represents the number of secondary entities that occur with both the ith primary entity and the jth primary entity. The matrix M is a matrix of terms in common.

From the terms-in-common matrix M, a matrix C of correlation coefficients is constructed, as shown in FIG. 6. In one implementation, the correlation coefficients may be calculated using the Pearson's correlation. In this implementation, Pearson's correlation coefficient is applied to primary vectors in primary space. The similarity score between the mth primary entity and the nth primary entity is the Pearson's correlation coefficient between the mth and nth rows of matrix M. If there are P primary entities, and thus P columns in the matrix M, the similarity between the nth entity and the mth entity is defined as follows:

$$S(m,n) = \frac{\sum_{\gamma=1}^{P}\left(M_{n\gamma} - \sum_{i=1}^{P}\frac{M_{ni}}{P}\right)\left(M_{m\gamma} - \sum_{j=1}^{P}\frac{M_{mj}}{P}\right)}{\sqrt{\sum_{\alpha=q}^{P}\left(M_{n\alpha} - \sum_{i=1}^{P}\frac{M_{ni}}{P}\right)^2}\sqrt{\sum_{\beta=1}^{P}\left(M_{m\beta} - \sum_{j=1}^{P}\frac{M_{mj}}{P}\right)^2}} \quad \text{Equation 2.0}$$

This is equivalent to defining the similarity between the nth and mth primary entities as the cosine of the angle between the zero meaned nth and mth row vectors of M. Equation 2.0 yields normalized correlation coefficients ranging from −1 to 1. The correlation coefficients may be utilized in clustering the primary entities, as discussed below.

Clustering

Different clustering implementations are possible given a set of primary entities and associated scores. The clustering techniques described below are not limited to clustering of providers associated with bidded search terms, but are applicable to other data, and may be used to cluster either actors or objects. As such, the clustering implementations described below are also applicable in searcher clickthrough implementations.

In one implementation, clusters may be identified by evaluating which rows in the matrix C correlate positively with each other. For this, positive Pearson's correlation coefficients may be summed for each provider and compared. The maximum score is used to determine selection of a provider for clustering. The cluster is formed of all the providers that have a positive correlation coefficient with the selected provider. The clustered providers are not considered for future clusters.

If further clustering is necessary, the matrix C of correlation coefficients is recalculated from a matrix M of the remaining terms in common, without the previously clustered providers. The next cluster is assigned from the recalculated matrix of correlation coefficients as before, and may be repeated until all the providers have been assigned to clusters. Thus, this technique may be considered as a hard non-hierarcical clustering technique.

Thus, in the example of FIG. 6, the first Coffee Merchant receives a score of 1.5, the Computer Programmer a score of 2.0, and the second Coffee Merchant a score of 1.5. The first Coffee Merchant with a top score of 1.5 is selected for clustering. The second Coffee Merchant is selected for cluster with the first Coffee Merchant since it has a positive correlation coefficient of 0.5 with the first Coffee Merchant.

In this limited example, a second cluster having only the Computer Programmer is identified without further calculation.

As illustrated in FIG. 7, clustering may be accomplished by identifying a universe of terms 710 associated with objects, entities, or the like. In the context of Internet searching, the universe of terms may include the search terms associated with web sites by either the web content providers themselves, or by other means. The search terms may be bidded terms. In some implementations, the terms may be descriptors. From the universe of terms, a terms-in-common matrix is calculated 720. From the terms-in-common matrix, correlation coefficients are calculated 730. Next, clusters are assigned 740 using the correlation coefficients.

Figure 8:
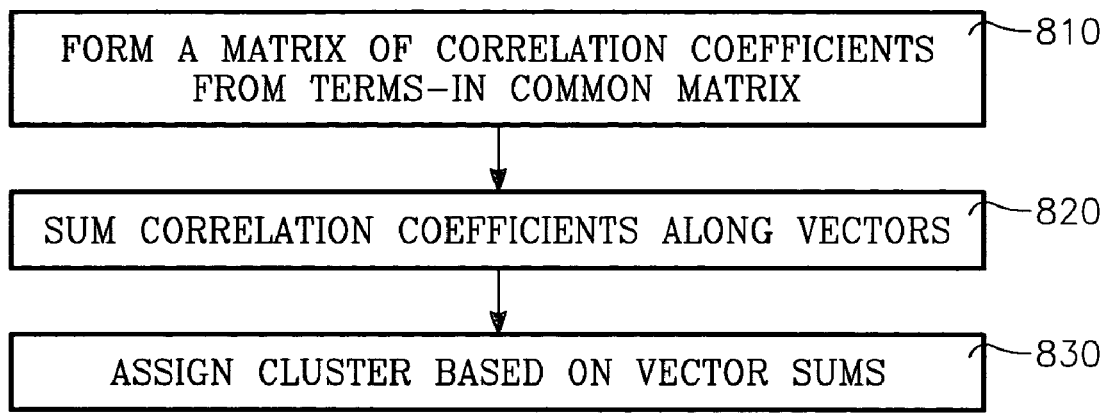
FIG. 8 is a flow chart illustrating clustering in accordance with one possible implementation of the present invention.
Figure 9:
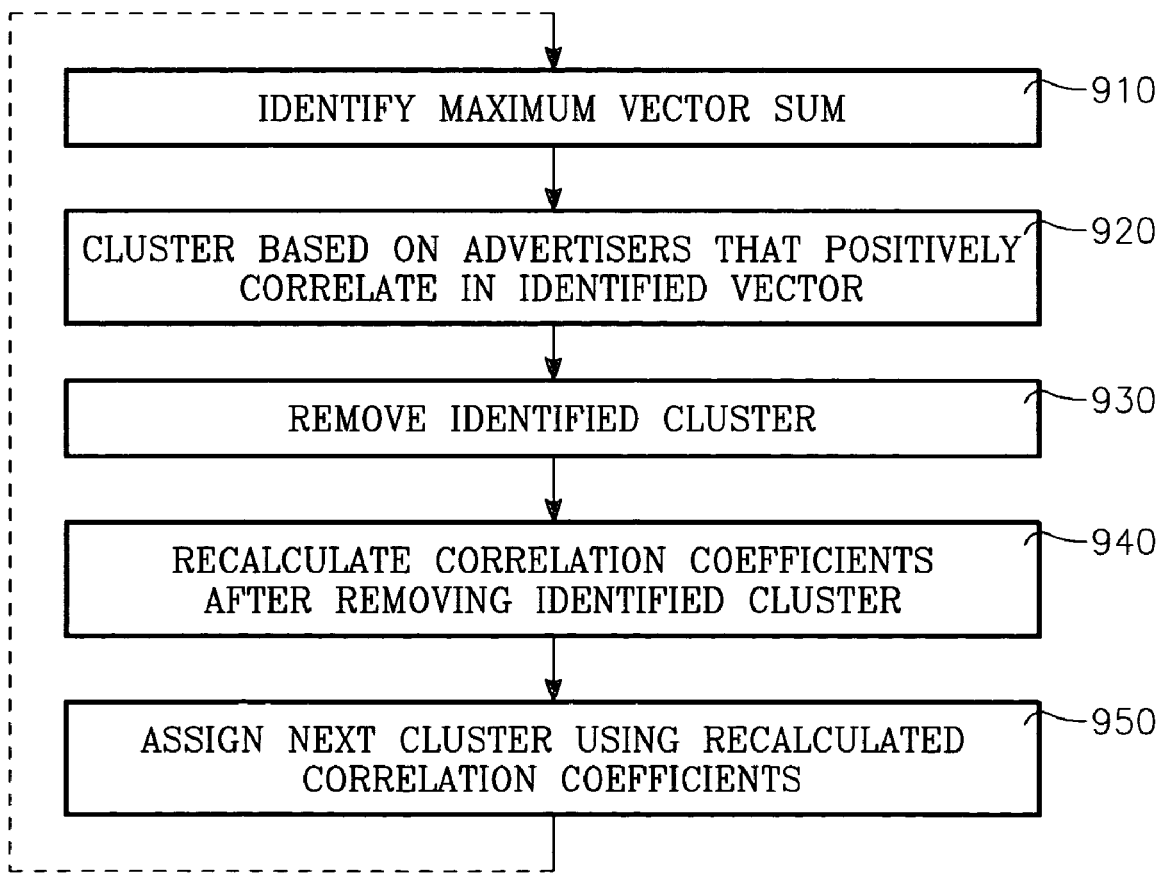
FIG. 9 is a flow chart illustrating clustering in accordance with one possible implementation of the present invention.

Referring to FIG. 8, a matrix of correlation coefficients may be formed 810 based on the terms-in-common matrix. The correlation coefficients are summed 820 along the rows (or columns) of the matrix. A cluster is assigned 830 based on the sums. As illustrated in FIG. 9, the clusters may be assigned by identifying a maximum row sum 910. A cluster is formed 920 from providers that positively correlate in the identified maximum sum. After the cluster is identified 920, the formed cluster is removed 930. The correlation coefficients are recalculated 940, and a next cluster is assigned 950 using the recalculated correlation coefficients. As shown by the dotted line, the above may be repeated, if desired, until all the providers are clustered.

In another clustering implementation, each primary entity is referred to as a node, and each pair of nodes having a positive similarity score are designated as an edge.

For each node $n_i$ identify all the nodes that share an edge with $n_i$ and identify them as a candidate cluster $c_{ni}$, labeled by the primary node. A score is assigned to the identified candidate cluster $c_{ni}$. The score assigned may be an average of all inter-node similarity scores calculated over all nodes within this candidate cluster.

After assigning candidate cluster scores, sort all identified candidate clusters from maximum to minimum by their cluster scores. Descend through the sorted candidate clusters and for each candidate cluster $c_{ni}$, remove all nodes which already have been assigned to an actual cluster from the candidate cluster $c_{ni}$. Then, create an actual cluster $C_{ni}$, and assign to it all nodes which remain in the candidate cluster $c_{ni}$.

In yet another clustering implementation, the edge are sorted by score from maximum to minimum. For each edge in descending order, $E_{n_i,n_j}$, starting with the highest scored edge, determine whether nodes $n_i$ or $n_j$ are assigned to a cluster. If neither is assigned, create a new cluster containing $n_i$ and $n_j$. If only one of the nodes is unassigned to a cluster, assign the unassigned node to the cluster comprising the assigned node. If both nodes are already assigned to different clusters leave the nodes as assigned. This produces flat clusters.

Figure 10:
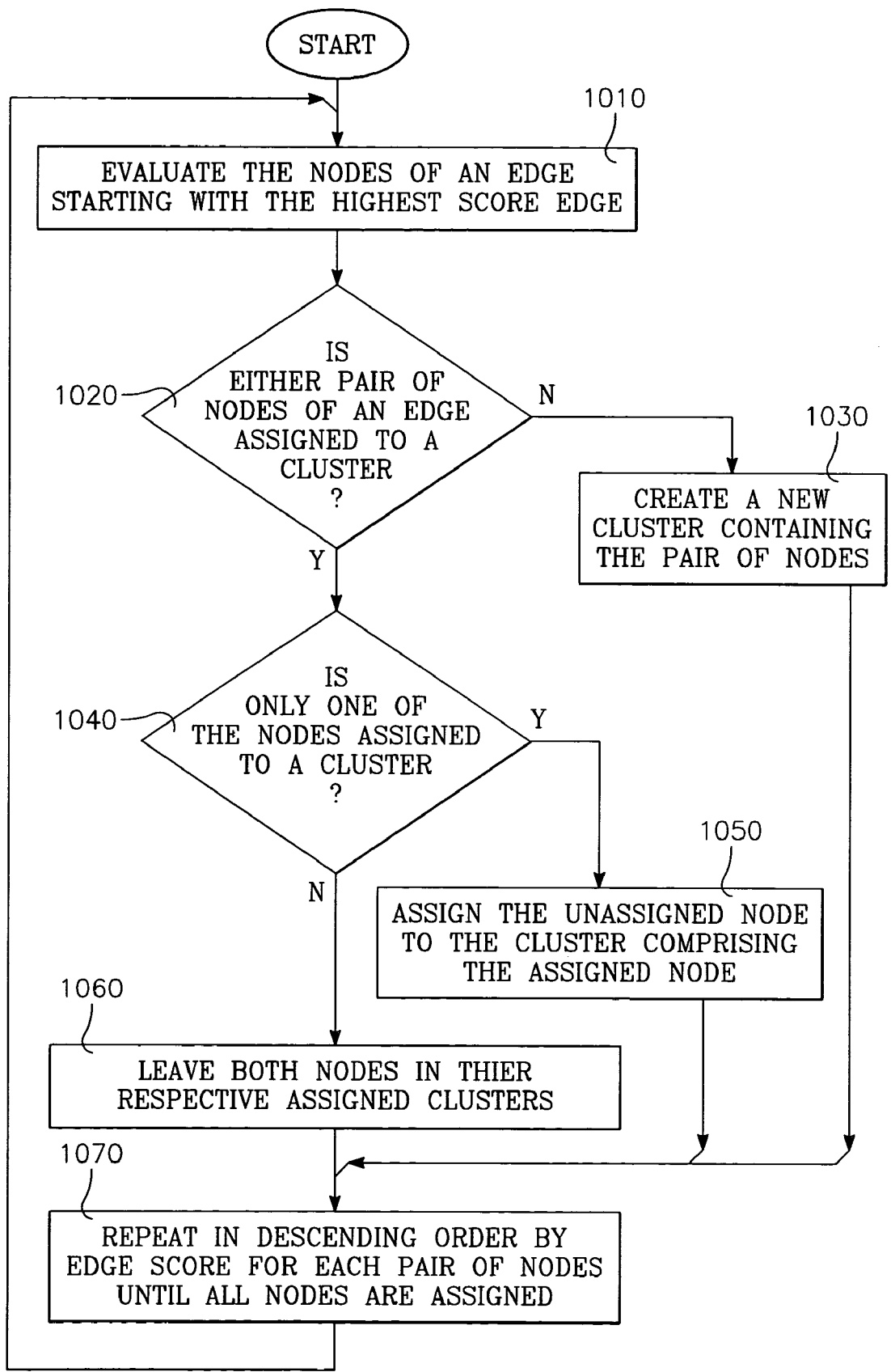
FIG. 10 is a flow chart illustrating clustering in accordance with one possible implementation of the present invention.

FIG. 10 shows an illustration in accordance with the preceding implementation. The pairs of nodes of each edge are evaluated 1010 starting with the highest score edge. Determine 1020 whether either of the pair of nodes of an edge is assigned to a cluster. If neither of the pair of nodes of an edge is assigned to a cluster, create 1030 a new cluster containing the pair of nodes. If only one of the pair of nodes is assigned to a cluster, assign 1050 the unassigned node to the cluster comprising the assigned node. If both nodes are already assigned, leave 1060 both nodes as assigned in their respective assigned clusters, no further assignment of these nodes is made. This is repeated 1070 for all edges in descending order based on edge score until all nodes are assigned.

In a modification of the above implementation, hierarchical clusters may be formed. Rather than leaving the nodes $n_i$ and $n_j$ as assigned if both nodes are assigned to different clusters $C_\alpha$, $C_\beta$ an inter-cluster edge $E_{C_\alpha,C_\beta}$ is defined (if one is not already defined). The score of $E_{C_\alpha,C_\beta}$ is incremented by the value of the score associated with $E_{n_i,n_j}$. The defined inter-cluster edge scores $E_{C_i,C_j}$ are each normalized by dividing each by the product of the number of objects in cluster $C_i$ times the number of objects in cluster $C_j$. If the number of unevaluated nodes is greater than the number of newly defined clusters and the number of clusters is greater then one, define a new set of nodes and edges such that $n'_i=C_i$ and $E_{n'_i,n'_j}=E_{C_i,C_j}$. The hierarchy level is defined by storing the relationship of each of the newly defined nodes in cluster $C_i$ and the original nodes $n_\alpha$. For example, store the information that the parent of $n_\alpha$ is $n'_i$.

The newly defined nodes and edges are then used in further clustering, starting from the beginning of the loop with the highest scored edge and in ascending order as discussed above. The clustering loop is repeated and continued until the hierarchical relationships are completed.

Figure 11:
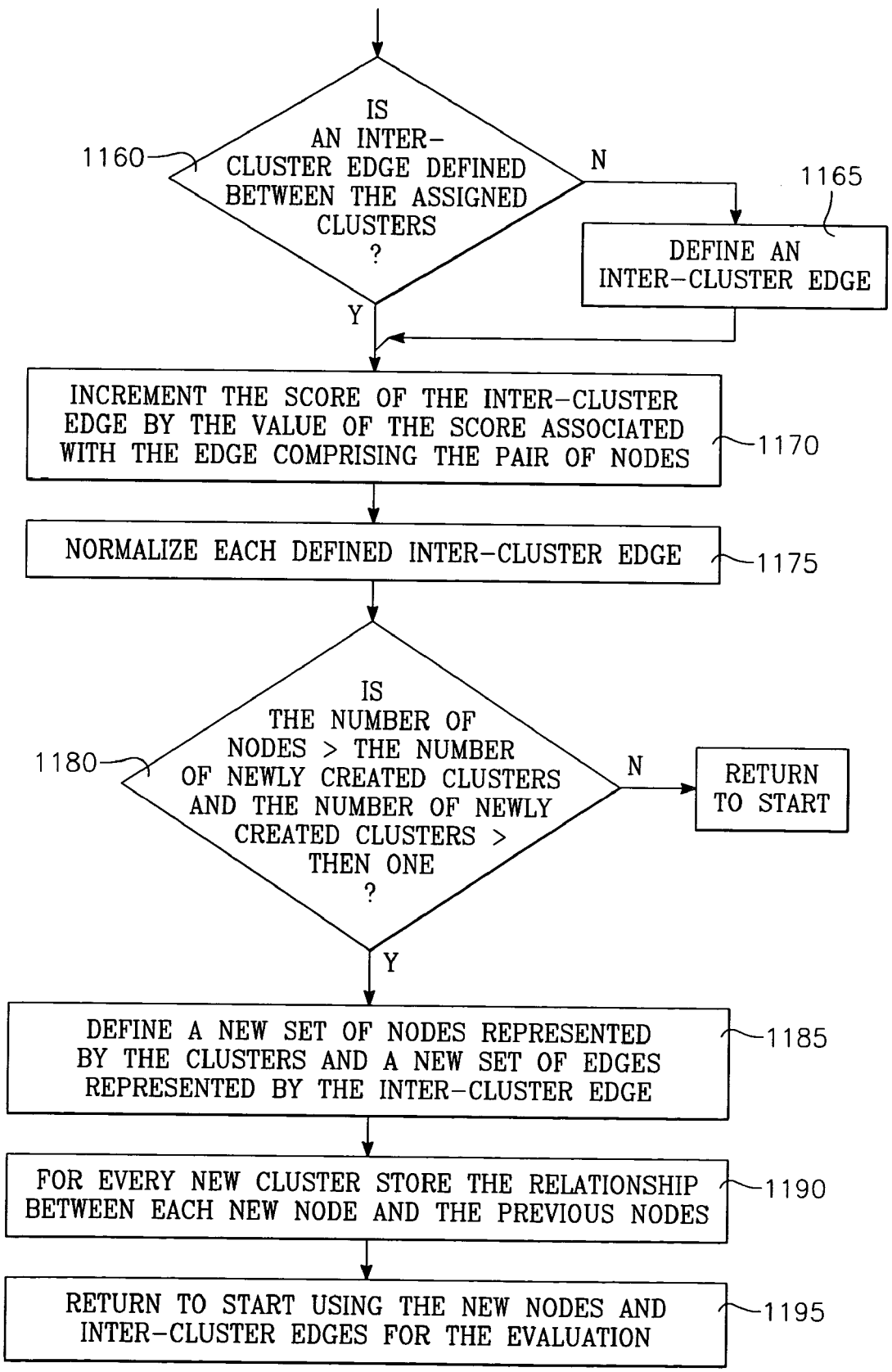
FIG. 11 is a flow chart illustrating clustering in accordance with one possible implementation of the present invention.

FIG. 11 shows an illustration in accordance with the preceding modified implementation. In the implementation of FIG. 10, if both nodes are clustered (yes to decision box 1020 and no to decision box 1040), rather than leaving 1060 both nodes in their respective assigned clusters, decide 1160 whether an inter-cluster edge is defined between the assigned clusters. If no inter-cluster edge defined, define 1165 an inter-cluster edge. If an inter-cluster edge is already defined, increment 1170 the score of the inter-cluster edge by the value of the score associated with the edge comprising the pair of nodes. After incrementing 1170, normalize 1175 each defined inter-cluster edge. Normalization 1175 may be accomplished by dividing the inter-cluster edge by the product of the number of objects in one of the clusters by the number of objects in the other of the clusters of the inter-cluster edge.

After normalization 1175, determine 1180 whether the number of total number of nodes is greater then the number of newly created clusters and whether the number of newly created clusters is greater then one. If both are true, define 1185 a new set of nodes represented by the clusters and new set of edges represented by the inter-cluster edges. If desired, for every new cluster store 1190 the relationship between each new node and the previous nodes. If desired, return 1195 to evaluation 1010 of the nodes and edges, using the new set of defined nodes and the new set of defined edges to identify further levels of the hierarchy structure.

Figure 12:
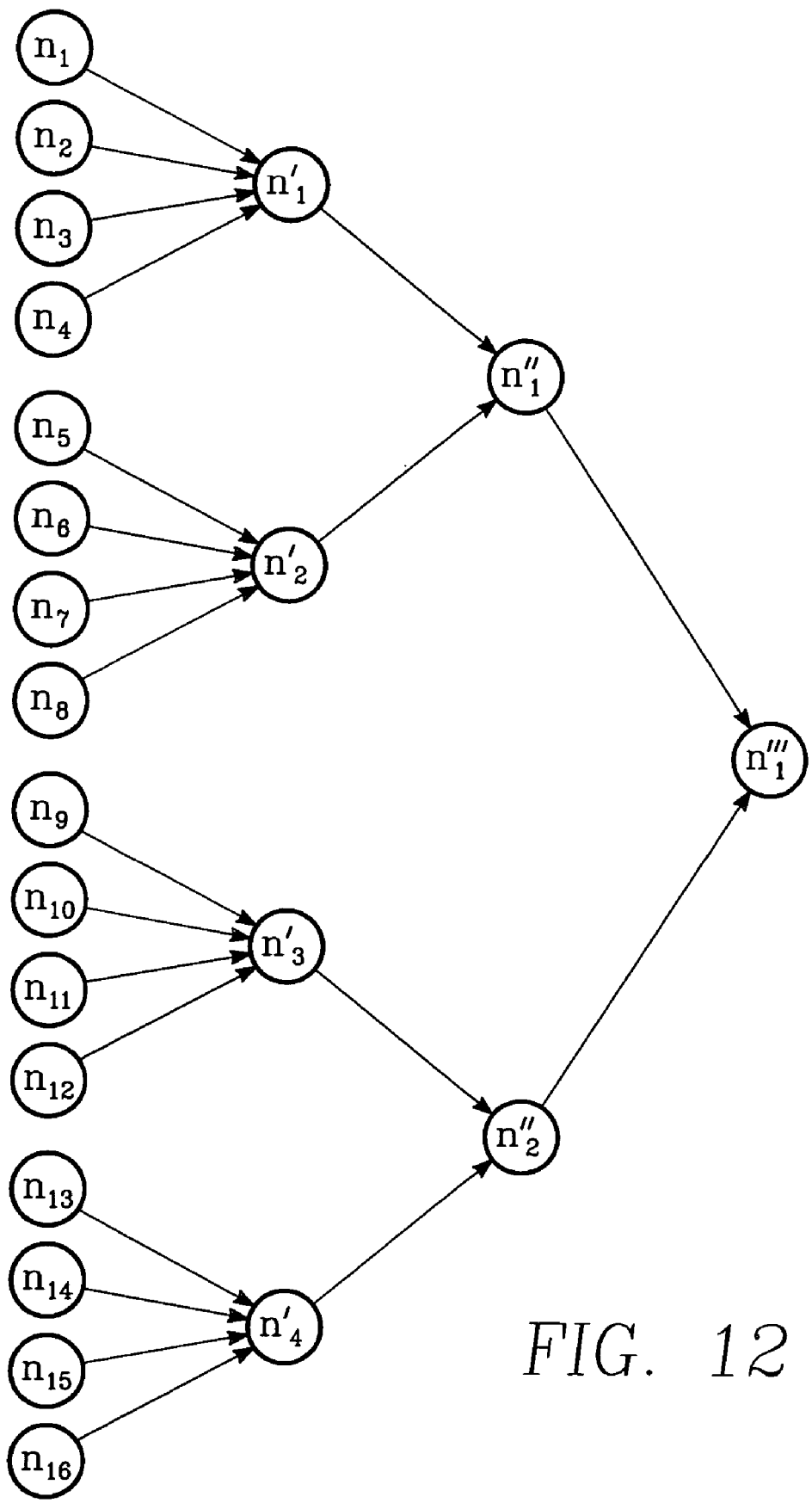
FIG. 12 shows an example illustration of a possible hierarchical tree resulting from the clustering implementation in accordance with FIG. 11.

FIG. 12 illustrates a possible example of a structure generated from the above hierarchical clustering implementation. The nodes that are the input of each loop refer successively to low levels of the tree. At the beginning of the first iteration the input nodes $n_1$ to $n_{12}$ are the leaves of the tree-the objects to be clustered. At the beginning of the second iteration of the loop, the nodes are the cluster-id's generated in the first loop. These cluster-id's represent the parent branches joining the leaf-nodes in the closest cluster. At the third iteration of the loop, the nodes are the cluster-id's generated in the second loop. These cluster-id's represent the parent branches joining the parent branches of the leaf-nodes—the cluster of the clusters of the nodes. When the clustering is finished, there is either one parent trunk, as shown in FIG. 12, which is the parent of all the parents of all the parents of all the nodes, or there are distinct branches that will not join. In either case there is a hierarchical tree-structure demonstrating proximal distance between nodes related to inter-node similarity.

Shown in FIG. 12 shows an example illustration of a possible hierarchical tree resulting from the above discussed clustering implementation. The nodes $n_1$ to $n_{12}$ represent the primary entities being clustered. All the parent nodes are generated cluster-ids. In this, the cluster $n''_1$ indicates that clusters $n'_1$ and $n'_2$ are siblings. This in turn suggests that $n_6$ is more similar to $n_1$ then it would be to $n_{16}$.

It should be noted that although in the above examples, the clustering of the occurrence and co-occurrence matrix can yield the same clusters, in a larger more complex sample of data, the clustering of correlation coefficients based on the occurrence matrix will lead to different results than the clustering of coefficients based the co-occurrence matrix. Thus, the two implementations will provide different clusters depending on the data.

B. Redundant Term Vectors

Another approach treats every search phrase a provider has bid on as a vector in provider space associating providers with each other. Redundant vectors suggest a stronger association. So for a given search phrase, t, look at A, and ordered vector space of all providers who have bid on t.

If for the search phrase t=java the three lineads the first Coffee Merchant, the Computer Programmer, and the second Coffee Merchant are the only advertisement on java, then our provider space would be three dimensional. The first dimension would be the first Coffee Merchant, the second dimension would be the Computer Programmer, and the third dimension would be the second Coffee Merchant.

We define a set of tuples S:{p,s}, where p is an element of P, the set of all search phrases bid upon by at least two providers in A, and s is the associated vector in A defined to be 1 in the dimension of A where the term has the provider, and 0 where it doesn't.

If every term these providers have bid on is listed in the table of FIG. 5, then our S would look like:

$$\begin{pmatrix} p & s \\ \text{java} & (111) \\ \text{coffee} & (101) \\ \text{coffeegift} & (101) \end{pmatrix}$$

An additional set of tuples C: {s', w} is defined where w is the number of times s' appears in S. Each element of C represents a cluster in interpretation space whose significance is described by the magnitude of w.

C for our example is given by:

$$\begin{pmatrix} s' & w \\ (111) & 1 \\ (101) & 2 \end{pmatrix}$$

Each of the three providers fall into the general cluster (1 1 1) associated with java. Only the two coffee results fall into the stronger cluster (1 0 1) associated with the terms coffee, and coffee gift.

This technique is applicable to much larger accounts where over 50 terms or more are bid on. There can be very strong vector redundancies for example, with 2000 terms in a forty dimensional provider space. There can be significant differences in the weights of the clusters which may offer insight not only in the relationships between lineads, but in how search phrases themselves are related.

C. E-M A/PProach

In another possible implementation, an expectation maximization or E-M algorithm may be applied. One use of the E-M algorithm is presented by A. Dempster, N. Laird, and D. Rubin in *Maximum Liklihood From Incomplete Data via the EM Algorithm*, Journal of the Royal Statistical Society, Series B, Vol. 39, pp. 1–38, 1977.

With this implementation, let L be the set of listings returned by the query, and $v(\lambda)$ be the provider corresponding to listing $\lambda \in L$. Let Q be the union of the sets of bidded phrases for all providers having a listing in L.

As per our earlier example of FIG. 5, L={First Coffee Merchant, Computer Programmer, second Coffee Merchant}. Q={cofee, coffee, coffee gift, vineyard, programming java, programming, beverage, tea, ansi c, build web site}.

Define a cluster signature S (c) for cluster c as a vector of probabilities with length |Q|.

Let the entropy of the cluster be defined as:

$$h(c) = -\sum_i S(c)_i \log_2 S(c)_i$$

Special case: for one cluster $c_1$, $S(c_1)_i$ is the number of providers who bid on search phrase $q_i$ Let element i of a provider signature $A(\alpha)_i$ for provider $\alpha$ be 1 if and only if $\alpha$ has bid on $Q_i$, 0 otherwise. Let $P(c|\lambda)$ for $\lambda \in L$ be the probability that $\lambda$ is a member of cluster c $$P(c \mid \lambda) = \prod_i S(c)_i \cdot A(v(\lambda))_i$$

Under assumptions about uniform drawing from listings:

$$P(c) = \sum_\lambda P(c \mid \lambda) \cdot \frac{1}{|L|}$$

When considering multi-click interactions, P(c) could be defined as follows:

$$P(c) \triangleq \sum_\lambda \sum_u \frac{P(c \mid \lambda) P(\lambda \mid u)}{|U|}$$

Let the probability of the listing set given the cluster (model) be defined as:

$$P(L \mid c) = \prod_{\lambda \in L} P(c, \lambda)$$

For multiple clusters, the entropy of the listings given the overall model is:

$$H = \frac{\sum_C P(c)h(c)}{\sum_C P(c)} = \sum_c P(c)\log_2 P(c)$$

An iterative procedure for K clusters is as follows:
Start: chose random values, i.i.d. between 0 and 1 non-inclusive, for all elements $S(c_j)$, $1 \leq i \leq K$
E-step: for each listing $\lambda \epsilon L$, for each cluster c, find $P(c|\lambda)$
M-step: new signature for $c = <\vec{A}>$ $$\vec{S}(c) = \frac{\sum_\lambda P(c|\lambda)\vec{A}(\upsilon(\lambda))}{\sum_\lambda P(c,\lambda)}$$

Entropy reduction δH can be used as a stopping criterion for the iterative procedure and for the number of clusters. As such, the stopping criteria may be a threshold value, for example one measured by a predetermined fixed number of iterations, or by an absolute or a relative entropy reduction threshold, such as for example a threshold derived from the graphical convergence. The threshold value, in such examples, may be determined by empirical means.

II. Correlation in Searcher Clickthrough

One of the most relevant data-stores available to any search engine is the behavior of searchers themselves. Search engine users click through on a result for a search only when the result's interpretation matches what the searcher is looking for. A searcher will not always be completely satisfied with the first link they follow and will quite typically, within the same session, click on additional results that match their desired interpretation. This generates an inherent conceptual association.

Each searcher received a set of search results associated with the search string they entered. Each search result is associated with a web page, a web content provider, etc. When the searcher clicks on a search result the clickthrough relationship between the searcher and the account, web page, web provider, or other information associated with the search result is logged. The actor entities in this data are the searchers, and the object entities are the accounts, web pages, web providers, or other associated information.

The searcher clickthrough relationship may correspond to all clickthroughs by searchers, or it may be limited to selected searcher clickthroughs. For example, the searcher clickthrough relationship be defined by clickthroughs of only bidded terms, or by all clickthroughs of searchers.

A. Clickthrough Occurrence

Figures 13, 14:
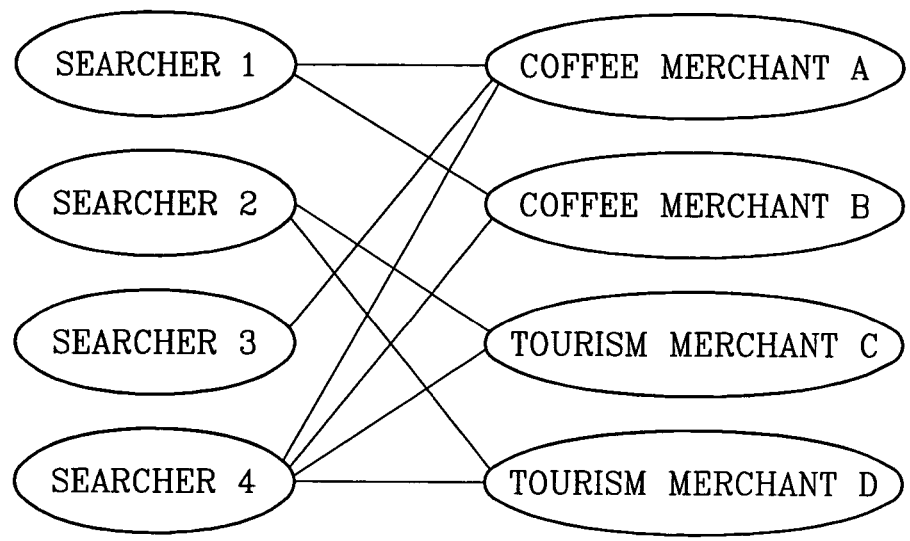
FIG. 13 is a bipartite graph example of searchers and the accounts associated showing clickthrough results.
FIG. 14 is an occurrence matrix A' of the example of FIG. 13.

Clickthrough data may be represented by an occurrence matrix. In one example, shown in FIG. 13, a bipartite graph of searchers and the accounts associated with the results they clicked on. The bipartite graph of FIG. 13 may be represented as occurrence matrix A' shown in FIG. 14. The searchers and web content providers are indexed such that the value of the ith row, jth column of the matrix, $A'_{ij}$, represents the occurrence of the ith searcher clicking on a result associated with the jth account. Although illustrated as resulting from a bipartite graph, the occurence matrix A' may be populated utilizing tabulated clickthrough data as discussed above. The occurrence matrix A' may be clustered using the clustering implementations discussed herein.

B. Correlation between Row Vectors

In general, a matrix S is defined whose elements $S_{ij}$ represent the number of unique search-ids that clicked on search-result $l_i$ and search-result $l_j$. Populate the matrix by presenting random subsets of the search-result set to searchers in random order-thus washing out the noise that rank-ordering imposes as the number of searches grows larger.

Once S is defined, a matrix C of correlation coefficients is formed and clusters defined as discussed above with reference to FIG. 6. For example, if we have three lineads for Java and in decreasing bid order they are: First Coffee Merchant, the Computer Programmer, and the second Coffee Merchant. The number of sessions that resulted in clickthroughs are tracked and stored in a co-occurrence matrix S of clickthroughs in common.

Turning to FIG. 15A, in one example, a matrix $S_1$ illustrates that after a first session with clickthroughs, there were clickthroughs on both the first Coffee Merchant and the second Coffee Merchant. The next clickthrough session, illustrated by the matrix $S_2$ of FIG. 15B, has a clickthrough only on the second Coffee Merchant. In FIG. 15C, illustrates a matrix $S_n$ an example of what a clickthrough matrix S could end up looking like after n sessions. In the example of FIG. 15C, the first Coffee Merchant and the second Coffee Merchant had users click on both in the same session more often than any of the coffee ones and the Computer Programmer.

It is significant to note that the co-occurrence matrix S may be populated using an occurrence matrix as discussed above. Thus, the values of S may be derived from the relationship, $S=A'A'^T$, where $A'^T$ the transpose matrix of the occurrence matrix A'.

The matrix $C_{java}$ shown in FIG. 15D is calculated using Equation 2.0 as above. The correlation matrix $C_{ij}$ is defined as:

$$C_{ij}=C(\vec{S}_i, \vec{S}_j)$$

In the matrix $C_{java}$, the two coffee lineads correlate with each other, and the programming linead only correlates with itself, presenting two clusters. Clustering implementations discussed above may be utilized in the clustering of clickthrough data.

III. Additional Implementations

A. Query Normalization

Interpretation clustering may be applied to find pairs of queries that should be combined and considered equivalent for search purposes. This can increase relevance of a search results set by expanding the mapping of related search phrases to bidded phrases. This increases the potential for search provider revenue as the search provider is able provide bidded lineads for more queries, thus showing bidded lineads to more searchers.

Further, search engines frequently collapse redundant bidded terms together to promote competition. If the number of different interpretation clusters for the resulting collapsed term increases as a result of the new mappings, there could be a decrease in relevance. Consider the difference between collapsing "animals" to "animal" verses collapsing "state police" to "police state." In the case of collapsing "animals" to "animal", there should be no additional interpretations added to the search results for "animal". In the case of collapsing "state police" to "police state" there certainly is. The ability to identify interpretation clusters allows identification of when search terms should be collapsed and when they should not.

If the combined terms have more clusters than the maximum of the two terms individually then a pair is a candidate for clustering. Further, it allows machine review of many more search phrases than could be reviewed by hand to determine which are synonymous, and thus could be collapsed. Thus, it could allow testing of all possible pairs of phrases.

B. Directory-Category Search

Some search engines have the capability to search within a directory structure. A searcher may have traversed a list of topics such as Entertainment→Music→Artists, then searched on the phrase "the cars". Such a searcher most likely wants to see search results that relate to the band named "The Cars". This searcher will most likely have no intention of clicking through to an automobile site.

For each node in the hierarchy a representative provider(s) may be assigned. Clustering may be used to identify a cluster that is consistent with a selected node. In this implementation, clustering may be utilized to determine what results to serve to a searcher. If the meaning of a possible result is consistent with the directory the searcher is in, it would be given priority when serving it to the searcher.

In a category search implementation, all the providers associated with the search term in a database are identified. All the terms from the identified providers, along with terms from representative providers of the directory, are selected as the universe for clustering. A search result is served from the cluster that contains the representative provider(s).

C. Search Term Suggestion

Implementations discussed herein may be utilized in the area of search term suggestion. Search term suggestion may include presenting additional search terms from different clusters as prompts to a searcher for disambiguation by the searcher, or it may be utilized to provide additional search terms to a provider for bidding purposes.

In the latter utilization, because different users will use different words in an attempt to find the same information, it is important for a provider to bid on a wide variety of search terms in order to maximize the traffic to its site. The better and more extensive a provider's list of search terms, the more traffic the provider will have. Some methods for search term suggestion are discussed in U.S. patent application Ser. No. 10/020,712, by Paine et al., filed Dec. 11, 2001, entitled RECOMMENDING SEARCH TERMS USING COLLABORATIVE FILTERING AND WEB SPIDERING, herein incorporated by reference in its entirety.

In one implementation of search term suggestion, relevant search phrases are supplied to a provider, based on the bidded search terms of other providers sharing the same concept space. In one implementation, rather than forming a co-occurrence matrix of terms in common, a co-occurrence matrix of providers in common is identified. For example, all the search terms of all the providers that share a same concept are retrieved for inclusion in the providers-in-common matrix. From the providers-in-common matrix, correlation coefficients are calculated, then clustered.

A matrix of correlation coefficients may be calculated using Equation 2.0 above. The matrix of correlation coefficients may be utilized in assigning clusters as discussed above. Hence, in one implementation, term vectors in the matrix are summed along positive correlations, a maximum term vector is selected, and a cluster is formed of terms positively correlating in the selected term vector. If further clustering is necessary, the matrix of correlation coefficients is recalculated, with the previously clustered terms removed. The next cluster is assigned from the recalculated matrix of correlation coefficients as before, and may be repeated until all the terms have been assigned to clusters.

In this case, the clusters would be formed of terms. The clusters would be used to influence the presentation of search term suggestions to a provider for consideration when selecting appropriate search terms. Results from the same, or from different clusters, may be included to improve search results coverage. The above described implementation may be utilized instead of, or in addition to other search term suggestion techniques.

D. Editorial Processes

Above implementations may be utilized to facilitate or eliminate the human review and approval process of search term selection. Human review of provider selected bidded search term is sometimes utilized in above referenced system of U.S. Pat. No. 6,269,361, by Davis et al., to ensure some measure of relevance of the listings. Search term selection is typically reviewed by a person to verify that the search term, title, description, and page are all consistent.

With the above described clustering implementations, if a provider bids on a search term and the provider is identified as being clustered with other providers already approved for that search term, the bidded search term may be approved based on the clustering results. Likewise, bids on terms that do not cluster well with other providers in the cluster may be rejected, or flagged for further review.

For example, if provider A has been approved for several terms including term x and provider B bids on term x and provider B's terms cluster well with provider A's terms, provider B may be automatically approved for term x, without the need for human review.

In yet other implementations, an ambiguity score may be assigned to search queries based on how they cluster. The ambiguity score may be utilized in prioritizing the human editorial effort, such as in prioritizing the reviewing of search term selections discussed above. The ambiguity score could be used as an indicator in deciding which terms to focus on first in such processes.

It is contemplated by the present inventors, that certain clustering implementations discussed above may be utilized along with existing techniques for automated clustering, such as with any of the text or link analysis methods. For example, it may be utilized in conjunction with the latent semantic indexing, hyperlink connectivity analysis, ect.

The implementations described herein may be utilized alone, or in conjunction with automated techniques such as described in U.S. patent application Ser. No. 10/267,557; by Cheung et al.; filed Sep. 13, 2002; entitled AUTOMATED PROCESSING OF APPROPRIATENESS DETERMINATION OF CONTENT FOR SEARCH LISTINGS IN WIDE AREA NETWORK SEARCHES; herein incorporated by reference in its entirety. Thus, implementations described herein may be utilized to improve the efficiency of a database processing system for evaluating candidate data items representing search listings that are submitted for inclusion into a search engine database.

E. Sub-Phrase Matching

In some situations, a search query may not have an exact match with a search result, but, results exist for sub-phrases, or combinations of sub-phrases, within the search query. For example, if there is no exact search results match for the phrase "vintage hat pin," but there are result sets for "vintage hat," "hat pin," and "vintage." In this situation, it is not clear which results best satisfy the user's intent. In the context of providing search results based on phrases bidded on by Internet content providers, a provider who bid on "vintage hat" may also have information regarding vintage hat pins. Similarly the provider who bid on "vintage" may provide information regarding vintage hat pins, while the provider that bid on "hat pin" may not.

In one implementation, each of the sub-phrases may be considered as interpretation clusters. The interpretation clusters may be considered when ordering the results within the search results listing. The different interpretation clusters may be utilized in selecting a more relevant cluster(s) for presentation, or in interleaving result to disambiguate and/or capture the different users' intent.

In another implementation, the bidded terms of each provider bidding on "vintage hat," "hat pin," and "vintage" are retrieved, combined, and the content providers clustered as discussed above. The results listing may then be ordered based on the interpretation clusters. Results that cluster well may suggest more relevance to the intended search. Or, results from different clusters may be interleaved to more effectively disambiguate and/or capture the different users' intent.

Thus, sub-phrase matching may be used in the bidded phrase context to match a search query to bidded phrases, where an exact match would not otherwise exist. This increases the potential for search provider revenue because potentially relevant results based on bidded terms may be provided for a search query that would otherwise not produce relevant results based on bidded terms.

IV. Ordering of Search Results Based on Interpretation Clusters

Once identified, interpretation clusters may be utilized to influence the position of a search listing in a search result set. In some circumstances, this may include giving priority to results from one or more interpretation clusters, and/or it may include interleaving of results from different interpretation clusters.

In one implementation, results selected from the largest cluster are presented near the top of results list. In another implementation, one result from each cluster may be presented near the top of a results list. In yet another implementation, results from clusters having greater probability of click-through based on click-through history of the providers in the clusters are presented near the top of the results listing.

With the bidded terms in a pay-for-performance Internet search engine, different word interpretations may relate to products with different profit margins, and thus different underlying economic values per click. Hence, programmers in java may be able to bid more for the term "java" than purveyors of coffee. If all meanings of terms are grouped together and presented in order by bid, without regard to interpretation clusters, the relevance of the terms listed and their ability to capture different users' intents is not optimized. Thus, the potential to generate revenue for the search providers is actually diminished in some situations.

Providing a relevant search result sooner rather than later is of particular interest in such systems. If a user is dissatisfied with a search result set because it fails to immediately provide a search result relevant to the user's intent, the user may move on with a new search, with another search provider. Thus, potential revenue to the search provider is lost. Also lost is the opportunity of potential providers to have traffic to their website. Identification of interpretation clusters allows interleaving of different interpretation clusters to present potentially relevant search results sooner rather than later.

Identification of different interpretation clusters and interleaving of search result from different interpretation clusters can allow sub-auctions for influencing the position of search results with respect to other providers that share a same interpretation cluster. Thus, providers can bid for different senses of terms based on their respective interpretation cluster, rather than simply bidding against all providers across all markets.

Interpretation clustering can allow interleaving of listings in a result set so as to provide a result set that has a combination of listings that lead to the best results. The best results may be determined by clickthroughs, or by maximum revenue generation (for a pay-for-performance Internet search engine).

In some implementations the results set will contain listings from different interpretation clusters. For example, listings from different clusters may be arranged in bid order in the result set. A listing from a cluster having the highest bid is positioned above the cluster having a lower bid, which in turn is positioned above the cluster with the lowest bid. Thus, if desired, one listing from each cluster may be ordered one, two, three, in position based on their relative bids. Or, more of the listings may be selected from a certain cluster based on their bid prices. For example, the first two positions may be selected from one cluster with the highest bid prices while the remaining positions are occupied by listings from other clusters.

In other implementations, the results set may contain listings and/or be ordered based on past performance of various combinations of interleaved results sets. For example, a result set may be formed having in its "first" position a listing selected from a cluster containing the highest bid listing, in its "second" position a listing from a cluster containing the highest revenue generating listing (i.e. highest revenue either when presented by itself, or in combination with other listings), in its "third" position a listing from a cluster not associated with either of the preceding selections, etc. The foregoing is for example purposes, order selection using other criteria, or combinations of criterion, as applied to any position is possible. For example, a predicted (or actual) clickthrough rate times the bid price could be the criterion for the "first" position. If desired, the responses to different result sets may be monitored to determine which combinations of clusters and presentation ordering provide the best outcome.

In one implementation, a randomized interleaving from different clusters is possible. In this implementation, one or more of the positions in the result set may contain a randomized listing. Further, as discussed above, the responses to different result sets may be monitored to determine which combinations of clusters and presentation ordering provide the best outcome. The best outcome may be based on observed revenue in the context of an interleaved results set, rather than based on the highest revenue of a listing in isolation, or its bid price.

With randomized ordering (as with other ordering possibilities), it is possible to switch to a deterministic ordering after monitoring clickthrough rates from a statistically relevant sample. Thus, a best interleaving order may be determined and used to order future result sets. Or, a preferential ordering may be selected, and then further monitored to ensure the best performance is continuously obtained.

The random ordering may be pseudo-random, biased-random, or according to a selected permutation. For example, listings from different clusters may be rotated to the "first" position. Or, the "first" and/or "second" positions may be fixed by some criteria, with listings being randomized for the "second" and/or "third" positions.

As such, in one implementation, an interleave ordering may be selected, the selected ordering presented to searchers, and the clickthrough rates compared for the various selected orderings. An interleave order can be found by comparing one interleave order to another and rejecting the less desirable ordering. This can be repeated until a preferred ordering in identified. Or, interleave orderings may be ranked, or sorted, based on the comparisons.

As discussed above, the performance of a selected ordering of a result sets may be monitored and adjusted, or re-selected, if it is not performing adequately.

The foregoing description has been presented for the purposes of illustration and description. It is not intended to be exhaustive or to limit the invention to the precise form or method disclosed. The above description is not limited to the specific implementations, embodiments, context, or examples discussed above. Aspects of some implementations, embodiments, or examples may be combined with other implementations, embodiments, or examples. Further, not all aspects of the implementations, embodiments, or examples are required in every implementation, embodiment, or example. Many modifications and variations are possible in light of the above teaching. It is intended that the scope of the invention be limited not by this description, but rather by the claims appended hereto.

What is claimed is:

1. A computer implemented method for increasing relevance of search results, the method comprising:
   receiving a search query;
   identifying the search query as ambiguous;
   clustering a plurality of search results for the search query into interpretation clusters;
   generating a search results list based on the interpretation clusters;
   wherein clustering comprises:
      identifying content providers corresponding to the plurality of search results;
      retrieving bidded search terms associated with each identified content provider;
      determining correlations between the identified content providers based on the retrieved bidded search terms;
      clustering positively correlating content providers based on the correlations;
   wherein clustering positively correlating content providers comprises:
      evaluating pairs of content providers having positive correlation score in descending order of correlation score;
      assigning content providers to clusters after each evaluation of a pair content providers, wherein assigning comprises:
         creating a new cluster comprising each content provider of a pair of content providers if neither content provider is assigned to a cluster and assigning each content provider of a pair of content providers to the new cluster; and
         assigning an unassigned content provider of a partially assigned pair of content providers to a cluster comprising a previously assigned content provider of the partially assigned pair of content providers if only one of the content providers of a pair of content providers was previously assigned to a cluster.

2. The method of claim 1 wherein generating the search results list further comprises ordering search results based on the interpretation clusters.

3. The method of claim 2 wherein identifying the search query as ambiguous comprises identifying at least one of: (a) an inherent ambiguity in the search query; (b) an under specified search query; or (c) a sub-phrase match for the search query.

4. The method of claim 3 wherein identifying the search query as ambiguous comprises identifying an absence of an exact match search result with the search query.

5. The method of claim 4 wherein clustering the plurality of search results associated with the search query comprises using at least one of: (a) bidded phrases, or (b) clickthrough data.

6. The method of claim 1 wherein identifying the search query as ambiguous comprises identifying absence of an exact match search result with the search query.

7. The method of claim 1 wherein clustering the plurality of search results associated with the search query comprises using at least one of: (a) bidded phrases, or (b) clickthrough data.

8. The method of claim 7 wherein clustering the plurality of search results associated with the search query comprises using bidded phrases.

9. The method of claim 1 wherein generating the search results list comprises interleaving search results from different interpretation clusters.

10. The method of claim 1 comprising identifying a plurality of search results as potential matches for the search query.

11. The method of claim 10 wherein clustering comprises using at least one of: (a) bidded search terms, or (b) searcher clickthrough terms.

12. The method of claim 11 wherein clustering comprises calculating Pearson's correlation coefficients.

13. The method of claim 12 wherein clustering comprises calculating an occurrence matrix.

14. The method of claim 13 wherein identifying a plurality of search results comprises identifying bidded search terms.

15. The method of claim 12 wherein clustering comprises calculating a co-occurrence matrix.

16. The method of claim 15 wherein identifying a plurality of search results comprises identifying bidded search terms.

17. The method of claim 1, wherein clustering positively correlating content providers comprises:
   summing correlation scores of positively correlating content providers for each content provider;
   selecting a highest scored content provider;
   forming a cluster including content providers having positive correlation with the highest scored content provider; and
   repeating summing, selecting, and forming after removing previously clustered content providers.

18. The method of claim 17 wherein clustering comprises using correlations of occurrence values.

19. The method of claim 18 wherein clustering comprises calculating Pearson's correlation coefficients.

20. The method of claim 17 wherein clustering comprises using correlations of co-occurrence values.

21. The method of claim 20 wherein clustering comprises calculating Pearson's correlation coefficients.

22. The method of claim 1, wherein assigning content providers to clusters after each evaluation of a pair content providers comprises leaving content providers as previously assigned if both content providers of a pair are already assigned.

23. The method of claim 1, further comprising clustering clusters so as to further define a hierarchical structure between the content providers.

24. The method of claim 23 further comprising storing relationship information corresponding to the hierarchical structure of clustered clusters.

25. The method of claim 1, wherein assigning content providers to clusters after each evaluation of a pair content providers further comprises:
clustering clusters if both content providers of a pair are already assigned to clusters comprising:
defining an inter-cluster score between the clusters of previously assigned content providers of a pair of content providers; and
incrementing an inter-cluster edge score by the correlation score associated with the pair of content providers.

26. The method of claim 25 further comprising normalizing the incremented inter-cluster score.

27. The method of claim 26 wherein normalizing comprises dividing the incremented inter-cluster score by a product of a number of objects in each of the clusters of previously assigned content providers.

28. The method of claim 1, further comprising sorting from maximum to minimum pairs of content providers having positive correlation score prior to evaluating.

29. A computer implemented method for disambiguation of search phrases, the method comprising:
identifying interpretation clusters using bidded search terms of content providers;
influencing a position of a search result in a search results list based on the interpretation clusters;
providing the search results list in response to a search query received by a searcher for review by the searcher;
wherein identifying interpretation clusters comprises:
evaluating pairs of content providers having positive correlation coefficients in descending order; and
assigning content providers to clusters after each evaluation of a pair content providers, wherein assigning comprises:
creating a new cluster comprising each content provider of a pair of content providers if neither content provider is assigned to a cluster and assigning each content provider of a pair of content providers to the new cluster; and
assigning an unassigned content provider of a partially assigned pair of content providers to a cluster comprising a previously assigned content provider of the partially assigned pair of content providers if only one of the content providers of a pair of content providers was previously assigned to a cluster;
wherein assigning content providers to clusters after each evaluation of a pair content providers comprises:
leaving content providers as previously assigned if both content providers of a pair are already assigned.

30. The method of claim 29 wherein identifying interpretation clusters comprises using correlations of occurrence values.

31. The method of claim 30 wherein identifying interpretation clusters comprises calculating Pearson's correlation coefficients and clustering along positive correlations.

32. The method of claim 31 wherein clustering comprises:
identifying content providers corresponding to the plurality of search results;
retrieving bidded search terms associated with each identified content provider;
determining correlations between the identified content providers based on the retrieved bidded search terms; and
clustering positively correlating content providers based on the correlations.

33. The method of claim 32 wherein clustering positively correlating content providers comprises:
summing correlation scores of positively correlating content providers for each content provider;
selecting a highest scored content provider;
forming a cluster including content providers having positive correlation with the highest scored content provider; and
repeating summing, selecting, and forming after removing previously clustered content providers.

34. The method of claim 29 wherein clustering comprises using correlations of co-occurrence values.

35. The method of claim 34 wherein identifying interpretation clusters comprises calculating Pearson's correlation coefficients and clustering along positive correlations.

36. The method of claim 34 wherein identifying interpretation clusters comprises:
calculating a matrix of bidded terms in common; calculating correlation coefficients corresponding to the bidded terms in common; and assigning interpretation clusters using the correlation coefficients.

37. The method of claim 36 wherein calculating correlation coefficients comprises calculating Pearson's correlation coefficients and clustering along positive correlations.

38. The method of claim 37 wherein clustering comprises:
identifying content providers corresponding to the plurality of search results;
retrieving bidded search terms associated with each identified content provider;
determining correlations between the identified content providers based on the retrieved bidded search terms; and
clustering positively correlating content providers based on the correlations.

39. The method of claim 38 wherein clustering positively correlating content providers comprises:
summing correlation scores of positively correlating content providers for each content provider;
selecting a highest scored content provider;
forming a cluster including content providers having positive correlation with the highest scored content provider; and
repeating summing, selecting, and forming after removing previously clustered content providers.

40. The method of claim 29, further comprising clustering clusters so as to further define a hierarchical structure between the content providers.

41. The method of claim 40 further comprising storing relationship information corresponding to the hierarchical structure of clustered clusters.

42. The method of claim 29 wherein assigning content providers to clusters after each evaluation of a pair content providers further comprises:

clustering clusters if both content providers of a pair are already assigned to clusters comprising:

defining an inter-cluster score between the clusters of previously assigned content providers of a pair of content providers; and incrementing an inter-cluster edge score by the correlation coefficient associated with the pair of content providers.

43. The method of claim 42 further comprising normalizing the incremented inter-cluster score.

44. The method of claim 29, further comprising sorting from maximum to minimum pairs of content providers having positive correlation coefficient prior to evaluating.

45. The method of claim 29 wherein identifying interpretation clusters comprises evaluating redundant term vectors.

46. The method of claim 29 wherein identifying interpretation clusters comprises defining a cluster signature based on an evaluation of probabilities of content providers being members of clusters.

47. The method of claim 29 wherein providing the search results comprises providing search results capable of review by a searcher wherein the searcher is an automated process representing a user's interest.

48. A computer implemented method for interpretation clustering, the method comprising:

identifying a plurality of terms and associated content providers;

calculating a matrix from the identified plurality of terms and associated content providers;

calculating similarity scores between content providers based on the matrix; and assigning interpretation clusters using the similarity scores wherein assigning intemretation clusters comprises:

evaluating pairs of content providers having correlating similarity scores in descending order of similarity score; and assigning content providers to clusters after each evaluation of a pair content providers, wherein assigning comprises:

creating a new cluster comprising each content provider of a pair of content providers if neither content provider is assigned to a cluster and assigning each content provider of a pair of content providers to the new cluster; and assigning an unassigned content provider of a partially assigned pair of content providers to a cluster comprising a previously assigned content provider of the partially assigned pair of content providers if only one of the content providers of a pair of content providers was previously assigned to a cluster;

wherein assigning content providers to clusters after each evaluation of a pair content providers comprises leaving content providers as previously assigned if both content providers of a pair are already assigned.

49. The method of claim 48 wherein calculating similarity scores comprises calculating Pearson's correlation coefficients.

50. The method of claim 49 wherein calculating a matrix comprises calculating an occurrence matrix.

51. The method of claim 50 wherein identifying comprises using bidded search terms.

52. The method of claim 50 wherein identifying comprises using searcher clickthrough terms.

53. The method of claim 49 wherein calculating a matrix comprises calculating a co-occurrence matrix.

54. The method of claim 53 wherein identifying comprises using at least one of: (a) bidded search terms, or (b) searcher clickthrough terms.

55. The method of claim 48 wherein calculating a matrix comprises calculating a co-occurrence matrix.

56. The method of claim 55 wherein identifying comprises using bidded search terms.

57. The method of claim 55 wherein identifying comprises using searcher clickthrough terms.

58. The method of claim 48, further comprising clustering clusters to define a hierarchical structure between the content providers.

59. The method of claim 58 further comprising storing relationship information corresponding to the hierarchical structure of clustered clusters.

60. The method of claim 48, wherein assigning content providers to clusters after each evaluation of a pair content providers further comprises:

clustering the clusters if both content providers of a pair are already assigned comprising:

defining an inter-cluster score between the clusters of previously assigned content providers of a pair of content providers; and incrementing an inter-cluster edge score by the similarity score associated with the pair of content providers.

61. The method of claim 60 further comprising normalizing the incremented inter-cluster score.

62. The method of claim 61 wherein normalizing comprises dividing the incremented inter-cluster score by a product of a number of objects in each of the clusters of previously assigned content providers.

63. The method of claim 48, further comprising sorting from maximum to minimum pairs of content providers having correlating similarity score prior to evaluating.

64. A method for interpretation clustering, the method comprising:

identifying a plurality of terms and associated content providers;

calculating a co-occurrence matrix of terms in common; calculating correlation coefficients corresponding to the terms in common; and assigning interpretation clusters using the correlation coefficients wherein identifying interpretation clusters comprises:

evaluating pairs of primary entities having positive correlation coefficients in descending order; and assigning primary entities to clusters after each evaluation of a pair primary entities, wherein assigning comprises:

creating a new cluster comprising each content provider of a pair of primary entities if neither content provider is assigned to a cluster and assigning each content provider of a pair of primary entities to the new cluster; and assigning an unassigned content provider of a partially assigned pair of primary entities to a cluster comprising a previously assigned content provider of the partially assigned pair of primary entities if only one of the content providers of a pair of content providers was previously assigned to a cluster.

wherein assigning content providers to clusters after each evaluation of a pair content providers comprises leaving content providers as previously assigned if both content providers of a pair are already assigned.

65. The method of claim 64 wherein identifying the plurality of terms comprises identifying one of: (a) bidded search terms, or (b) click-through terms.

66. The method of claim 65 wherein calculating correlation coefficients comprises calculating normalized correlation coefficients.

67. The method of claim 66 wherein assigning interpretation clusters comprises clustering along positive correlations.

68. The method of claim 67 wherein clustering positively correlating content providers comprises:
   summing correlation scores of positively correlating content providers for each content provider;
   selecting a highest scored content provider;
   forming a cluster including content providers having positive correlation with the highest scored content provider; and
   repeating summing, selecting, and forming after removing previously clustered content providers.

69. The method of claim 64, further comprising clustering clusters so as to further define a hierarchical structure between the content providers.

70. The method of claim 69 further comprising storing relationship information corresponding to the hierarchical structure of clustered clusters.

71. The method of claim 64, wherein assigning content providers to clusters after each evaluation of a pair content providers further comprises:
   clustering clusters if both content providers of a pair are already assigned to clusters comprising:
   defining an inter-cluster score between the clusters of previously assigned content providers of a pair of content providers; and
   incrementing an inter-cluster edge score by the correlation coefficient associated with the pair of content providers.

72. The method of claim 71 further comprising normalizing the incremented inter-cluster score.

73. The method of claim 64, further comprising sorting from maximum to minimum pairs of content providers having positive correlation coefficient prior to evaluating.

74. The method of claim 64 wherein identifying the plurality of terms comprises selecting search terms preselected by a content provider.

75. The method of claim 74 wherein identifying the plurality of terms comprises selecting search terms preapproved for relevance with the content provider.

76. The method of claim 74 wherein identifying the plurality of terms comprises selecting bidded search terms.

77. The method of claim 64 wherein identifying the plurality of terms and associated content providers comprises
   including search terms of a content provider representative of a directory category.

78. A computer readable medium comprising executable instructions for performing a method for providing search results in response to a search query, the method comprising:
   identifying the search query as ambiguous;
   clustering a plurality of search results for the search query into interpretation clusters using at least one of (a) bidded phrases, or (b) clickthrough data; and
   generating a search results list comprising ordering results based on the interpretation clusters;
   wherein clustering positively correlating content providers comprises:
      evaluating pairs of content providers having positive correlation score in descending order of correlation score; and
   assigning content providers to clusters after each evaluation of a pair content providers, wherein assigning comprises:
      creating a new cluster comprising each content provider of a pair of content providers if neither content provider is assigned to a cluster and assigning each content provider of a pair of content providers to the new cluster; and
      assigning an unassigned content provider of a partially assigned pair of content providers to a cluster comprising a previously assigned content provider of the partially assigned pair of content providers if only one of the content providers of a pair of content providers was previously assigned to a cluster;
   wherein assigning content providers to clusters after each evaluation of a pair content providers comprises leaving content providers as previously assigned if both content providers of a pair are already assigned.

79. The computer readable medium of claim 78 wherein clustering comprises:
   identifying content providers corresponding to the plurality of search results;
   retrieving bidded search terms associated with each identified content provider;
   determining correlations between the identified content providers based on the retrieved bidded search terms; and
   clustering positively correlating content providers based on the correlations.

80. The computer readable medium of claim 78, wherein clustering positively correlating content providers comprises:
   summing correlation scores of positively correlating content providers for each content provider;
   selecting a highest scored content provider;
   forming a cluster including content providers having positive correlation with the highest scored content provider; and
   repeating summing, selecting, and forming after removing previously clustered content providers.

81. The system of claim 80 wherein clustering positively correlating content providers comprises:
   summing correlation scores of positively correlating content providers for each content provider;
   selecting a highest scored content provider;
   forming a cluster including content providers having positive correlation with the highest scored content provider; and
   repeating summing, selecting, and forming after removing previously clustered content providers.

82. The system of claim 81 further comprising normalizing the incremented inter-cluster score.

83. The computer readable medium of claim 78, wherein clustering comprises using correlations of occurrence values.

84. The computer readable medium of claim 83 wherein clustering comprises using correlations of co-occurrence values.

85. The system of claim 83 wherein clustering comprises using correlations of occurrence values.

86. The system of claim 83 wherein clustering comprises using correlations of co-occurrence values.

87. The computer readable medium of claim 78, further comprising clustering clusters so as to further define a hierarchical structure between the content providers.

88. The computer readable medium of claim 78, wherein assigning content providers to clusters after each evaluation of a pair content providers further comprises:
   clustering clusters if both content providers of a pair are already assigned to clusters comprising:
   defining an inter-cluster score between the clusters of previously assigned content providers of a pair of content providers; and
   incrementing an inter-cluster edge score by the correlation score associated with the pair of content providers.

89. The computer readable medium of claim 78, further comprising normalizing the incremented inter-cluster score.

90. The system of claim 78 wherein clustering comprises:
   identifying content providers corresponding to the plurality of search results;
   retrieving bidded search terms associated with each identified content provider;
   determining correlations between the identified content providers based on the retrieved bidded search terms; and
   clustering positively correlating content providers based on the correlations.

* * * * *